United States Patent
Wang et al.

(10) Patent No.: US 8,991,212 B2
(45) Date of Patent: Mar. 31, 2015

(54) METHOD FOR MANUFACTURING PLATE INORGANIC NONMETAL MATERIAL USING MOLTEN SLAG

(75) Inventors: Qingtao Wang, Shandong (CN); Xianjin Yu, Shandong (CN); Xin Zhao, Shandong (CN); Benkui Gong, Shandong (CN); Zhenxia Wei, Shandong (CN); Yueyun Li, Shandong (CN); Jun Ming, Shandong (CN)

(73) Assignee: Shandong Coking Group Co., Ltd. (CN)

( * ) Notice: Subject to any disclaimer, the term of this patent is extended or adjusted under 35 U.S.C. 154(b) by 177 days.

(21) Appl. No.: 13/820,570

(22) PCT Filed: Sep. 20, 2011

(86) PCT No.: PCT/CN2011/079895
§ 371 (c)(1),
(2), (4) Date: Mar. 4, 2013

(87) PCT Pub. No.: WO2012/041173
PCT Pub. Date: Apr. 5, 2012

(65) Prior Publication Data
US 2013/0167586 A1 Jul. 4, 2013

(30) Foreign Application Priority Data

Sep. 27, 2010 (CN) .......................... 2010 1 0293061

(51) Int. Cl.
| | | |
|---|---|---|
| C04B 5/06 | (2006.01) | |
| B28B 1/54 | (2006.01) | |
| C03B 18/02 | (2006.01) | |
| C04B 18/14 | (2006.01) | |
| C04B 33/132 | (2006.01) | |
| C04B 33/138 | (2006.01) | |
| C04B 33/14 | (2006.01) | |
| C21B 3/08 | (2006.01) | |

(52) U.S. Cl.
CPC ... *C04B 5/06* (2013.01); *B28B 1/54* (2013.01); *C03B 18/02* (2013.01); *C04B 18/141* (2013.01); *C04B 33/1321* (2013.01); *C04B 33/138* (2013.01); *C04B 33/14* (2013.01); *C21B 3/08* (2013.01); *C04B 2235/3206* (2013.01); *C04B 2235/3208* (2013.01); *C04B 2235/3232* (2013.01); *C04B 2235/3241* (2013.01); *C04B 2235/3262* (2013.01); *C04B 2235/3272* (2013.01); *C04B 2235/3275* (2013.01); *C04B 2235/3279* (2013.01); *C04B 2235/3281* (2013.01)
USPC .................................. 65/19; 65/95

(58) Field of Classification Search
CPC ............ C04B 5/06; C03B 5/173; C03B 18/02
USPC ....................................... 65/19, 95
See application file for complete search history.

(56) References Cited

U.S. PATENT DOCUMENTS

| | | | | |
|---|---|---|---|---|
| RE37,328 E | * | 8/2001 | Pecoraro et al. ................ | 501/70 |
| 2010/0152014 A1 | * | 6/2010 | Landa et al. .................... | 501/71 |

FOREIGN PATENT DOCUMENTS

| | | | |
|---|---|---|---|
| CN | 1065646 | 10/1992 | |
| CN | 1923741 | 3/2007 | |
| CN | 101020968 | 8/2007 | |
| CN | 101121948 | 2/2008 | |
| CN | 101259987 | 9/2008 | |
| CN | 101289332 | 10/2008 | |
| CN | 101318787 | 12/2008 | |
| CN | 101323503 | 12/2008 | |
| CN | 101372405 | 2/2009 | |
| CN | 101559953 | 10/2009 | |
| CN | 101698568 | 4/2010 | |
| CN | 101805128 | 8/2010 | |
| JP | 62065950 A | * 3/1987 | ............ C03B 37/022 |

OTHER PUBLICATIONS

International Search Report for PCT/CN2011/079895, English translation attached to original, Both completed by the Chinese Patent Office on Dec. 5, 2011, All together 8 Pages.

* cited by examiner

*Primary Examiner* — Queenie Dehghan
(74) *Attorney, Agent, or Firm* — Brooks Kushman P.C.

(57) ABSTRACT

A method for manufacturing a plate inorganic nonmetal material by using a molten slag by introducing the molten slag into a pool for preserving heat and modifying, wherein a temperature of the molten slag is 1450° C.-1600° C., and modifying a viscosity and/or a color of the molten slag according to requirements of the product manufactured. The modified molten slag is introduced into a float process furnace using tin or tin alloy carrier forming a plate of inorganic nonmetal material which is discharged at 1000-1300° C. The plate is maintained at 600° C.-900° C. for 0.5-2 hours in a non-reducing atmosphere, and then cooled to a room temperature within 1-2 hours. An energy-saving and efficient method for comprehensively utilizing the blast furnace slag is provided. The produced plate inorganic nonmetal material has such characteristics as stable color quality, abrasion resistance, pressure resistance, strong adhesiveness, low coefficient of expansion and low shrinkage ratio.

9 Claims, No Drawings

METHOD FOR MANUFACTURING PLATE INORGANIC NONMETAL MATERIAL USING MOLTEN SLAG

CROSS-REFERENCE TO RELATED APPLICATION

This application is the U.S. national phase of PCT Appln. No. PCT/CN2011/079895 filed on Sept. 20, 2011, which claims priority to CN Patent Application No. 201010293061.3 filed on Sept. 27, 2010, the disclosures of which are incorporated in their entirety by reference herein.

FIELD OF INVENTION

The present invention relates to a technical filed of inorganic nonmetal material, more particularly, to a method for manufacturing a plate inorganic nonmetal material by using a molten slag.

DESCRIPTION OF RELATED ART

The ferrous metallurgy industry has produced a huge amount of waste slag which may be hardly brought to multi-purpose utilization. The existing waste slag has already become a major culprit for environment pollution and a factor that limits the development of the metallurgy industry. The disposal of the waste slag generally used in current industry is as follows: discharging a slag from a furnace at 1500-1600° C.; cooling down the slag by using water (referred to as "water quench" in practice); picking up and drying the slag; and making the dried slag into powders to be used to manufacture cement. However, the above process can only deal with a part of waste slag, moreover, said process may produce waste water and waste gas, and, what's worse, a large amount of sensible heat contained in the blast furnace slag is wasted and may bring further pollution to the environment.

Since the current production and research on the use of blast furnace slag are based on the waste slag processed by water quench, the consumption of fresh water to cool down the waste slag cannot be reduced, and the heat energy contained in the molten slag is not efficiently utilized, moreover, there might be a secondary waste generated and not all the waste slag can be processed and utilized.

Therefore, it is desired to provide a method for effectively utilizing the huge amount of furnace slag.

SUMMARY OF THE INVENTION

An object of the present invention is to provide a method for manufacturing a plate inorganic nonmetal material by directly modifying a molten slag and using a float process.

In order to achieve the above object, an aspect of the present invention provides a method for manufacturing a plate inorganic nonmetal material by using a molten slag including: introducing the molten slag into a pool for preserving heat and modifying, wherein a temperature of the molten slag is maintained at 1450° C.-1600° C., and modifying a viscosity and/or a color of the molten slag according to requirements of a product to be manufactured; introducing the modified molten slag into a float process furnace using tin or tin alloy as a carrier and preparing the plate inorganic nonmetal material from the modified molten slag, and discharging the plate inorganic nonmetal material at 1000-1300° C.; and maintaining the plate inorganic nonmetal material at 600° C.-900° C. for 0.5-2 hours in a non-reducing atmosphere, and then gradually cooling the plate inorganic nonmetal material to a room temperature within 1-2 hours, wherein the molten slag includes 10-40 wt % of $Al_2O_3$, 5-25 wt % of MgO, 10-50 wt % of $SiO_2$, 10-40 wt % of CaO, 0.1-5 wt % of $TiO_2$, 0.1-5 wt % of FeO and 0.1-5 wt % of MnO. More particularly, a cooling rate may be preferably 5-10° C. per minute.

In an embodiment of the present invention, the molten slag may include 10-20 wt % of $Al_2O_3$, 5-10 wt % of MgO, 20-35 wt % of $SiO_2$, 20-30 wt % of CaO, 0.1-5 wt % of $TiO_2$, 0.1-5 wt % of FeO and 0.1-5 wt % of MnO.

In an embodiment of the present invention, a viscosity modifier to modify the viscosity may be at least one of clay, porcelain clay, lodestone, pottery clay, feldspar and quartz sand, and is added in an amount of 5-20 wt % based on a weight of the molten slag. A color modifier to modify the color may be at least one of oxides of Ti, Cr, Ni, Cu, Co and Fe and rare earth elements, ore powders containing the oxides and industry wastes containing the oxides, and is added in an amount of 0-5 wt % based on a weight of the molten slag.

In an embodiment of the present invention, the molten slag is a molten slag directly discharged from a metallurgy reactor or is a remolten slag.

DETAILED DESCRIPTION OF THE PREFERRED EMBODIMENTS

Embodiments according to the present invention will be described in detail hereinafter.

A molten blast furnace slag is a waste produced in iron making using a blast furnace, which includes 10-40 wt % of $Al_2O_3$, 5-25 wt % of MgO, 10-50 wt % of $SiO_2$, and 10-40 wt % of CaO as well as a small amount of FeO, C, MnO, S and the like, and the temperature of which is in the range of 1350° C.-1480° C. Preferably, the molten blast furnace slag includes 10-20 wt % of $Al_2O_3$, 5-10 wt % of MgO, 20-35 wt % of $SiO_2$, and 20-30 wt % of CaO as well as a small amount of FeO, C, MnO, S and the like.

An embodiment of the present invention provides a method for manufacturing a plate inorganic nonmetal material by using a molten slag, and the molten slag may include 10-40 wt % of $Al_2O_3$, 5-25 wt % of MgO, 10-50 wt % of $SiO_2$, 10-40 wt % of CaO, 0.1-5 wt % of $TiO_2$, 0.1-5 wt % of FeO and 0.1-5 wt % of MnO. Preferably, the molten slag may include 10-20 wt % of $Al2O_3$, 5-10 wt % of MgO, 20-35 wt % of $SiO_2$, 20-30 wt % of CaO, 0.1-5 wt % of $TiO_2$, 0.1-5 wt % of FeO and 0.1-5 wt % of MnO. The molten slag may be a molten slag directly discharged from a metallurgy reactor or a remolten slag. According to the method of the present invention, the molten slag discharged from the blast furnace may be directly utilized, thereby not only saving the power consumption for melting a raw material, but also avoiding the consumption of water for cooling down the blast furnace slag by water quench and the generation of a secondary waste.

In the method of the present invention, the temperature of the molten slag in a pool for preserving heat and modifying is controlled to be in the range of 1450° C.-1600° C. How to modify the molten slag is determined according to properties and color of a product to be manufactured, wherein the modification includes an adjustment of viscosity and/or color.

More particularly, a viscosity modifier may be at least one of clay, porcelain clay, lodestone, pottery clay, feldspar and quartz sand. The viscosity modifier is added in an amount of 5-20 wt % based on a weight of the molten slag. A color modifier may be at least one of oxides of Ti, Cr, Ni, Cu, Co and Fe, such as $TiO_2$, $Cr_2O_3$, NiO, CuO, CoO, FeO, $Fe_2O_3$ and the like, ore powders containing these oxides and industry wastes containing these oxides, such as coal gangue and red mud.

The color modifier is added in an amount of 0-5 wt % based on a weight of the molten slag.

Next, the modified molten slag is introduced into a float process furnace using tin or tin alloy as a carrier, thereby preparing a plate inorganic nonmetal material. The plate inorganic nonmetal material produced by a float process is discharged from the float process furnace at 1000-1300° C.

The plate inorganic nonmetal material is maintained at 600° C.-900° C. for 0.5-2 hours in a non-reducing atmosphere, and then is gradually cooled to a room temperature within 1-2 hours so as to obtain a resulting plate inorganic nonmetal material, wherein a cooling rate may be 5-10° C. per minute. If the cooling rate is too great, a defect such as macroscopic cracks or microscopic cracks will be induced; and if the cooling rate is too small, the productivity will be decreased.

Hereinafter, examples of the present invention will be described in detail.

EXAMPLE 1

A molten slag including 15 wt % of $Al_2O_3$, 15 wt % of MgO, 30 wt % of $SiO_2$, 35 wt % of CaO, 1 wt % of $TiO_2$, 2 wt % of FeO and 2 wt % of MnO was used as an original material. Quartz sand was added to the molten slag having a temperature of 1600° C. in an amount of 20 wt % based on a weight of the molten slag to adjust the viscosity and composition of the molten slag. In this example, no color modifier was added. Next, the modified molten slag was introduced into a float process furnace using tin or tin alloy as a carrier to produce a plate inorganic nonmetal material, which was then discharged from the float process furnace at 1300° C. Next, the plate inorganic nonmetal material was maintained at 900° C. for 2 hours in a non-reducing atmosphere, and then was gradually cooled to a room temperature within 2 hours so as to obtain a desired plate inorganic nonmetal material having a desired size and color.

EXAMPLE 2

A molten slag including 14 wt % of $Al_2O_3$, 17 wt % of MgO, 28 wt % of $SiO_2$, 32 wt % of CaO, 1.5 wt % of $TiO_2$, 4 wt % of FeO and 3.5 wt % of MnO was used as an original material. Lodestone was added to the molten slag having a temperature of 1500° C. in an amount of 15 wt % based on a weight of the molten slag to adjust the viscosity and composition of the molten slag. Further, iron oxide red was added to the molten slag in an amount of 5 wt % based on the weight of the molten slag so as to adjust the color of the molten slag. Next, the modified molten slag was introduced into a float process furnace using tin or tin alloy as a carrier to produce a plate inorganic nonmetal material, which was then discharged from the float process furnace at 1200° C. Next, the plate inorganic nonmetal material was maintained at 850° C. for 1.5 hours in a non-reducing atmosphere, and then was gradually cooled to a room temperature within 2 hours so as to obtain a desired plate inorganic nonmetal material having a desired size and color.

EXAMPLE 3

A molten slag including 15 wt % of $Al_2O_3$, 15 wt % of MgO, 30 wt % of $SiO_2$, 35 wt % of CaO, 1 wt % of $TiO_2$, 2 wt % of FeO and 2 wt % of MnO was used as an original material. Pottery clay was added to the molten slag having a temperature of 1450° C. in an amount of 5 wt % based on a weight of the molten slag to adjust the viscosity and composition of the molten slag. Further, iron oxide red was added to the molten slag in an amount of 2 wt % based on the weight of the molten slag so as to adjust the color of the molten slag. Next, the modified molten slag was introduced into a float process furnace using tin or tin alloy as a carrier to produce a plate inorganic nonmetal material, which was then discharged from the float process furnace at 1000° C. Next, the plate inorganic nonmetal material was maintained at 700° C. for 2 hours in a non-reducing atmosphere, and then was gradually cooled to a room temperature within 1.5 hours so as to obtain a desired plate inorganic nonmetal material having a desired size and color.

EXAMPLE 4

A molten slag including 14 wt % of $Al_2O_3$, 17 wt % of MgO, 28 wt % of $SiO_2$, 32 wt % of CaO, 1.5 wt % of $TiO_2$, 4 wt % of FeO and 3.5 wt % of MnO was used as an original material. Clay was added to the molten slag having a temperature of 1500° C. in an amount of 12 wt % based on a weight of the molten slag to adjust the viscosity and composition of the molten slag. Further, iron oxide red was added to the molten slag in an amount of 1 wt % based on the weight of the molten slag so as to adjust the color of the molten slag. Next, the modified molten slag was introduced into a float process furnace using tin or tin alloy as a carrier to produce a plate inorganic nonmetal material, which was then discharged from the float process furnace at 1200° C. Next, the plate inorganic nonmetal material was maintained at 600° C. for 0.5 hour in a non-reducing atmosphere, and then was gradually cooled to a room temperature within 1 hour so as to obtain a desired plate inorganic nonmetal material having a desired size and color.

The method for manufacturing a plate inorganic nonmetal material by using a molten slag according to the embodiments of the present invention has the following advantages:

1) An energy-saving and efficient method for comprehensively utilizing the blast furnace slag is provided;

2) The molten slag discharged from the blast furnace is directly utilized, thereby not only saving the power consumption for melting a raw material, but also avoiding the consumption of water for cooling the blast furnace slag by water quench and the generation of the secondary waste; and 3) The produced plate inorganic nonmetal material has such characteristics as stable color quality, abrasion resistance, pressure resistance, strong adhesiveness, low coefficient of expansion and low shrinkage ratio.

In addition, the method for manufacturing a plate inorganic nonmetal material through a float process by using a molten slag according to the embodiments of the present invention solves the following problems: 1) the temperature is high, and thus it is necessary to redesign a process and devices; and 2) the viscosity of the molten slag is much lower than that of a glass melt, and thus it is necessary to add a viscosity modifier such as silicon dioxide thereto.

The plate inorganic nonmetal product manufactured through a float process by using the molten slag according to the embodiments of the present invention may be applicable to decoration and fitment for a building, ground and wall. In addition, various art goods may be obtained by processing a un-solidified product.

The present invention is not limited to the above embodiments, and various modification and changes may be made without departing from the scope of the present invention.

What is claimed is:

1. A method for manufacturing a plate inorganic nonmetal material by using a molten slag, comprising:

introducing the molten slag into a pool for preserving heat and modifying, wherein a temperature of the molten slag is maintained at 1450° C.-1600° C., and modifying a viscosity and/or a color of the molten slag according to requirements of a product to be manufactured;

introducing the modified molten slag into a float process furnace using tin or tin alloy as a carrier and preparing the plate inorganic nonmetal material from the modified molten slag, and discharging the plate inorganic nonmetal material at 1000-1300° C.; and maintaining the plate inorganic nonmetal material at 600° C.-900° C. for 0.5-2 hours in a non-reducing atmosphere, and then gradually cooling the plate inorganic nonmetal material to a room temperature within 1-2 hours, wherein the molten slag includes 10-40 wt % of $Al_2O_3$, 5-25 wt % of MgO, 10-50 wt % of $SiO_2$, 10-40 wt % of CaO, 0.1-5 wt % of $TiO_2$, 0.1-5 wt % of FeO and 0.1-5 wt % of MnO.

2. The method according to claim 1, wherein the molten slag includes 10-20 wt % of $Al_2O_3$, 5-10 wt % of MgO, 20-35 wt % of $SiO_2$, 20-30 wt % of CaO, 0.1-5 wt % of $TiO_2$, 0.1-5 wt % of FeO and 0.1-5 wt % of MnO.

3. The method according to claim 2, wherein a viscosity modifier to modify the viscosity is at least one of clay, porcelain clay, lodestone, pottery clay, feldspar and quartz sand, and is added in an amount of 5-20 wt % based on a weight of the molten slag.

4. The method according to claim 2, wherein a color modifier to modify the color is at least one of oxides of Ti, Cr, Ni, Cu, Co, Fe and rare earth elements, ore powders containing the oxides and industry wastes containing the oxides, and is added in an amount of 0-5 wt % based on a weight of the molten slag.

5. The method according to claim 2, wherein the molten slag is a molten slag directly discharged from a metallurgy reactor or a remolten slag.

6. The method according to claim 1, wherein the plate inorganic nonmetal material is cooled to the room temperature at a cooling rate of 5-10° C. per minute.

7. The method according to claim 1, wherein a viscosity modifier to modify the viscosity is at least one of clay, porcelain clay, lodestone, pottery clay, feldspar and quartz sand, and is added in an amount of 5-20 wt % based on a weight of the molten slag.

8. The method according to claim 1, wherein a color modifier to modify the color is at least one of oxides of Ti, Cr, Ni, Cu, Co, Fe and rare earth elements, ore powders containing the oxides and industry wastes containing the oxides, and is added in an amount of 0-5 wt % based on a weight of the molten slag.

9. The method according to claim 1, wherein the molten slag is a molten slag directly discharged from a metallurgy reactor or a remolten slag.

\* \* \* \* \*